April 20, 1937.  M. Y. SEATON  2,077,857
DRY CLEANING
Filed Oct. 29, 1936
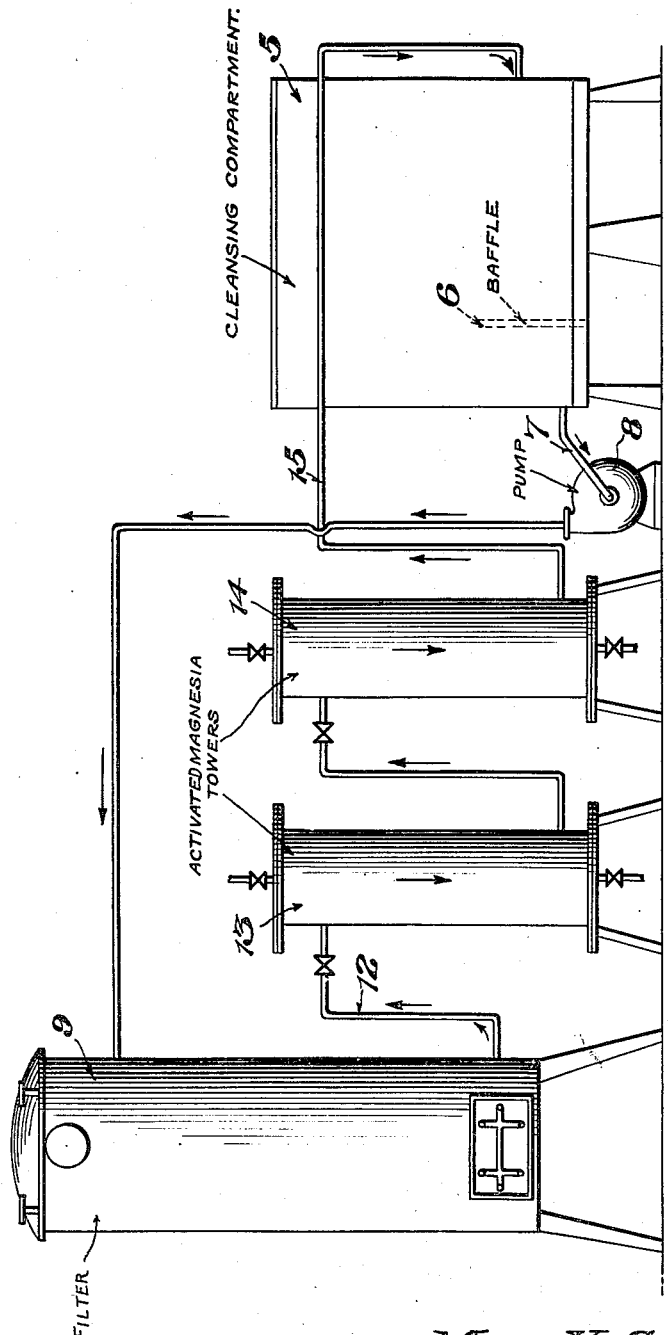
Inventor
Max Y. Seaton,
By K. P. McElroy
Attorney Patented Apr. 20, 1937

2,077,857

UNITED STATES PATENT OFFICE 2,077,857

DRY CLEANING

Max Y. Seaton, Greenwich, Conn., assignor, by mesne assignments, to Westvaco Chlorine Products Corporation, New York, N. Y., a corporation of Delaware Application October 29, 1936, Serial No. 108,285

6 Claims. (Cl. 210—203)

This invention relates to dry cleaning; and it comprises a method of and apparatus for dry cleaning with the aid of non-aqueous solvents, such as carbon tetrachloride, wherein the solvent, after use and before re-use, is passed through a column of granulated activated magnesia; all as more fully hereinafter set forth and as claimed.

Dry cleaning is a kind of washing, using a dry liquid. Sometimes the liquid is a hydrocarbon, such as gasoline or other petroleum light oils, but often it is a chlorinated hydrocarbon. There are several of these chlorinated hydrocarbons in use in dry cleaning, including trichlorethylene and carbon tetrachloride. Both are well adapted for the cleaner's purposes and neither gives a fire hazard. Carbon tetrachloride is regarded as one of the best of these chlorinated hydrocarbons for the dry cleaners' purposes. However, hydrocarbons of close boiling point, such as gasoline, Stoddard's solvent, etc., give good results.

In the routine of dry cleaning, the garments are agitated in a bath or spray of solvent and this solvent, carrying dirt and grease with it, goes forward through a filter to storage for return in another operation. After a time, when the solvent becomes too unclean, it is usual to redistil it. The use of a still, however, introduces complications in a dry cleaning establishment and particularly where dry cleaning is installed in an existing laundry. Distillation of dry cleaning liquids, all of which are quite volatile, presents technical difficulties in manipulation of the still; and moreover the stills are relatively costly. For these reasons, many efforts have been made to do away with the necessity of using a still in dry cleaning installations by introduction of various methods of cleaning used solvent. Activated carbon, fuller's earth and many other materials have been tried but none is really effective in removing dissolved matter other than color. The necessity for distillation is postponed but not obviated by their use.

I have found that by running used solvent through a relatively short column of granular activated magnesia, there is an efficient removal of dissolved matter; it is not merely color that is taken up. In this use, the magnesia column retains its effectiveness for a considerable period of time.

All magnesia, either hydrated or dehydrated, has some degree of adsorbent power; it will remove dissolved matters from solution by adsorption. Its power of purifying non-aqueous liquids, (in which its chemical properties do not come into play) is surprisingly great. The power varies, however, considerably, according to the character of the magnesia and its previous history. Dehydrated magnesia has considerable adsorbent power and completely calcined magnesite has been occasionally used as an adsorbent over a long period of time. I have, however, found that dehydration in a special way gives the highest grade of activity; the kind of activity that is desirable in regenerating dry cleaners' solvents. The dehydration of the magnesia is so controlled as to give an incomplete removal of water of hydration; a product consisting, empirically considered, of a mixture of MgO and Mg(OH)$_2$ in some proportion. Materials well adapted for the present purposes result with a dehydration so conducted as to give about 10 per cent of apparent residual hydroxide. In another application, Serial No. 81,654, I have described and claimed production of activated magnesia in this way and of this character.

In testing the adsorptive power of magnesia and other materials, I have found that evaluation is best in terms of what I may call an iodine number; the quantity of iodine (expressed in milliequivalents times 100) removed by a gram of magnesia from a solution of iodine in carbon tetrachloride; the solution being present in ample amount so that absorption of part of it from solution causes no appreciable difference in the concentration of the solution. This test is free of a number of objections which obtain in evaluating adsorbent power by removing the natural color of oils and other liquids. Using this test, one of the best commercial activated carbons gives an iodine number of about 100 and completely calcined magnesite gives a value of about 55. But by dehydrating pure hydroxide under conditions leaving 10 per cent residual hydroxide, I can make preparations which, by this test, give values as high as 145.

Activity is, to some extent, also conditioned on the purity of the magnesia, the presence of chloride being particularly detrimental. With as much as 1 per cent NaCl in the material to be dehydrated, the final product may have its activity halved.

While in the present invention any grade of magnesia may be used, the activated magnesias are better and the highly activated magnesia described ante functions best. The life of a charge of activated material used in the present method is very much longer than that of a similar charge of ordinary magnesia. The efficiency per cubic foot is also much greater with activated than with other magnesias, rendering possible the use of apparatus of relatively small dimensions.

Properly activated magnesia has a number of curious properties, some of which are effective in the present process. It appears to have a selective action on free fatty acids contained in used carbon tetrachloride and withdraws them. Free fatty acids usually occur in used cleaners' solvent and are quite objectionable; partly because of their odor. Its withdrawing power for ordinary fatty oil is not so great. Hydrocarbons of high molecular weight, such as those of lubricating oil, are withdrawn more completely than ordinary fatty oils. Curiously enough, fatty acids withdrawn by magnesia in the present invention can afterwards be extracted from the magnesia with alcohol. Withdrawal is not due to the formation of a magnesia soap. The magnesia is also effective in abstracting coloring matters from the dry cleaning liquid; its decolorizing power is high.

All woolen garments contain a certain amount of oil and this is necessary for flexibility of the fiber. One difficulty in scouring with the usual non-aqueous solvents is that the withdrawal of the wool oils is rather complete; garments are left with a harsh texture which is not liked. But, for some reason, re-used solvent which has been purified by passage over activated magnesia does not exercise this harshening effect on the wool. The probable reason is that the magnesia withdraws glyceride oils down to a certain low concentration but not completely; a certain amount of neutral oils are left in the solvent and are not abstracted by the magnesia. Once used carbon tetrachloride passed over activated magnesia is, as a matter of fact, a better scouring agent than fresh, never-used carbon tetrachloride. Per contra, when the dirty carbon tetrachloride is purified by distillation, the purified distillate is substantially free from all oils, and woolens cleaned with it have some harshness, until the oil content of the circulating liquid builds up to an equilibrium value.

The presence of any fatty acids in a garment tends towards rancid odor and it is one of the advantages of the present invention that the fatty acids are very effectively extracted and fixed by the magnesia; they do not go back with solvent returned for re-use.

In practical embodiments of the present invention, the usual washing and scouring equipment is employed, with the used liquid sent through an ordinary filter to get rid of mechanical impurities. The filtered solvent is then passed through a column of granulated activated magnesia, usually about wheat size. Passage through the bed of magnesia may be a simple percolation. After a time, the activity of the magnesia begins to diminish and solvent comes through carrying color and odor. At this time, a fresh charge of magnesia is placed in the apparatus. It is not usually worth while to regenerate the magnesia, although it can be done in various ways.

A dry scouring equipment usually includes a washer, circulating pump and filter. In typical embodiments of the present invention, a magnesia purifier is placed in the return line between the filter and the washer. In many installations, this purifier consists of two small vessels or towers about 8 inches in diameter and 24 inches high, each filled with granular activated oxide held in removable baskets. A charge of about 25 pounds suffices for each tower. The two towers are connected in series. With an installation such as this and with carbon tetrachloride as the cleaning liquid, as a rule 3000 to 5000 pounds of clothes can be cleaned before the oxide purifying system requires attention. When effluent liquid exhibits color, the first tower in the series is emptied and re-charged with magnesia from the second tower; the latter being charged with fresh magnesia. While pipe connections can be installed in a well understood way to enable either tower to be made first in series and the other second, the necessity for recharging comes seldom and it is usually simpler to move the magnesia. In the ordinary routine of operation the two charges of magnesia are operated in series until color begins to come through and then the magnesia is changed as described. Even with dirty heavy wool clothes, a charge of 25 pounds of magnesia in each tower will keep the circulating liquid in condition until at least 1500 pounds have been cleaned. During this time, the used solvent going to the scouring device for re-use will be light enough in color so that white silk or velvet dipped in it and dried does not change in color. This test may be used in determining the necessity for a change of magnesia.

For some reason, the presence in series of a magnesia cleaner lightens the load on the ordinary filter; there seems to be less tendency to build up pressure in the filter. For this reason, the period of service of an ordinary filtering charge is considerably enhanced when the filtered solvent is treated by magnesia as described. One type of filter much used clogs rather readily and it has been found in practice that by using activated magnesia in series, the charge in this filter stands up as long as the magnesia; that is to say, to a minimum of about 1500 pounds of clothes.

An incidental advantage of the present system is that the non-aqueous solvent is kept substantially dry or water free at all times.

A practical result of the economies secured by the present invention is that two distillations and three filter changes are done away with in scouring up to 1500 pounds of clothes.

In the accompanying illustration, I have shown, more or less diagrammatically, an organization of apparatus elements within the purview of the present invention and useful in the performance of the described process.

In this showing, element 5 is an agitator or washing device of the type usual in dry cleaning, having an interior baffle indicated at 6. Soiled liquid is withdrawn through pipe 7 and pump 8 and sent through filter 9. The liquid after filtering is passed via pipe 12 through towers 13 and 14 arranged in series and containing activated magnesia. From the towers it is returned via line 15 to the scouring device for re-use.

In making a highly effective activated magnesia for the present purposes, the process described in my prior and copending application Serial No. 81,654 may be followed. Substantially pure magnesium hydroxide is calcined in a muffle or other apparatus until most, but not all, of the water of hydration is removed. Effective preparations can be made with as little as 2 per cent residual hydroxide and the content of hydroxide may run as high as 75 per cent. As stated, a preparation with 10 per cent residual hydroxide works well. The material is ground and sized to obtain granules passing a 10–20 mesh screen and remaining on a finer screen. The second screen may be 20, 28 or 40 mesh, according to the size granules desired for the particular apparatus.

In a dry cleaning establishment, there is a constant loss of solvent by evaporation and otherwise and solvent is ordinarily bought in drums. It is found by experience that the life period of a charge of activated magnesia is about the same as that of the usual drum of solvent; and it is possible to market both together, a drum of carbon tetrachloride, for example, being accompanied by a cartridge of activated magnesia.

What I claim is:—

1. In the operation of dry cleaning clothes with volatile solvents in a scouring apparatus, the process which comprises transmitting used solvent through a filter and thence past a column of activated magnesia back to the scouring apparatus.

2. The process of claim 1 wherein the volatile solvent is a chlorinated hydrocarbon.

3. The process of claim 1 wherein the volatile solvent is carbon tetrachloride.

4. In rehabilitating volatile solvent used in dry cleaning clothing, the process which comprises filtering the used solvent and passing it through a column of granulated magnesia containing both MgO and $Mg(OH)_2$ and resulting from the partial dehydration of pure magnesium hydroxide.

5. In dry cleaning clothes with a chlorinated solvent, the process of restoring the efficiency of used solvent which comprises passing it through a column of activated magnesia.

6. In a dry cleaning system the combination of a scouring machine, a filter, a tower packed with activated magnesia and pipe connections permitting cyclic circulation of solvent through the system from the scouring machine through the filter and the tower and back to the machine.

MAX Y. SEATON.